(12) United States Patent
Weidenbruch et al.

(10) Patent No.: US 8,878,136 B2
(45) Date of Patent: Nov. 4, 2014

(54) RADIOMETRIC MEASURING DEVICE

(75) Inventors: Simon Weidenbruch, Lorrach (DE);
Hartmut Damm, Teningen (DE);
Robert Schauble, Herrischried (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 223 days.

(21) Appl. No.: 13/266,328

(22) PCT Filed: Apr. 8, 2010

(86) PCT No.: PCT/EP2010/054653
§ 371 (c)(1),
(2), (4) Date: Oct. 26, 2011

(87) PCT Pub. No.: WO2010/127920
PCT Pub. Date: Nov. 11, 2010

(65) Prior Publication Data
US 2012/0043466 A1 Feb. 23, 2012

(30) Foreign Application Priority Data
May 5, 2009 (DE) .......................... 10 2009 002 816

(51) Int. Cl.
*G01F 23/284* (2006.01)
*G01F 23/288* (2006.01)

(52) U.S. Cl.
CPC .......... *G01F 23/288* (2013.01); *G01F 23/2885* (2013.01)
USPC ..................................... 250/363.01; 250/367

(58) Field of Classification Search
USPC ........ 250/361 R, 362, 363.01, 367, 368, 369, 250/458.1, 459.1
See application file for complete search history.

(56) References Cited

U.S. PATENT DOCUMENTS

| | | | |
|---|---|---|---|
| 5,298,756 | A | 3/1994 | McCollum |
| 6,198,103 | B1 | 3/2001 | Houillion |
| 8,410,449 | B2 | 4/2013 | Thon |
| 2006/0138330 | A1 | 6/2006 | Baldwin |

FOREIGN PATENT DOCUMENTS

| | | |
|---|---|---|
| EP | 1068494 B1 | 1/2001 |
| JP | 09080156 A * | 3/1997 |
| WO | 2009031074 A2 | 3/2009 |

OTHER PUBLICATIONS

Von Dipl.-ing. Alecsandru Nistor, "Moderne Radiometrische Fullstandmesstechnik", Messen. Prufen, Automatisieren, 1988, No. 10, Germany.

\* cited by examiner

*Primary Examiner* — Mark R Gaworecki
(74) *Attorney, Agent, or Firm* — Bacon & Thomas, PLLC

(57) ABSTRACT

A radiometric measuring device comprising: a radioactive radiator which sends radioactive radiation through a container; and a detector serving to receive a radiation intensity penetrating through the container, dependent on the physical, measured variable, and to convert such into an electrical output signal. The detector includes a carrier, on which at least one scintillation fiber is wound, which converts radiometric radiation impinging thereon into light flashes, whose light propagates in the respective scintillation fiber toward its ends. The detector further includes at least one array of avalanche photodiodes operated in a Geiger mode, which convert light impinging thereon into an electrical signal. The detector also has a measuring device electronics connected to the avalanche photodiodes for producing the electrical output signal, based on the electrical signals of the avalanche photodiodes.

13 Claims, 9 Drawing Sheets

RADIOMETRIC MEASURING DEVICE

TECHNICAL FIELD

The invention relates to a radiometric measuring device, which serves to measure a physical, measured variable, especially a fill level or a density, of a fill substance located in a container, or to monitor a exceeding or subceeding (or falling beneath) of a predetermined limit value for the physical, measured variable.

BACKGROUND DISCUSSION

Radioactive measuring devices include radioactive radiators, which, during operation, send out radioactive radiation through the container, and include detectors, which serve to detect a radiation intensity penetrating through the container, which is dependent on the physical, measured variable to be measured, and to convert this into an electrical output signal. Radiometric measuring devices are typically always applied when conventional measuring devices are not applicable due to especially rough conditions at the measuring location. Very frequently, extremely high temperatures and pressures reign, for example, at the measuring location, or highly chemically and/or mechanically aggressive environmental influences are present, which make the use of other measuring methods impossible.

In radiometric measurements technology, a radioactive radiator, e.g. a Co 60 or Cs 137 preparation, is installed in a radiation protection container, and placed at a measuring location, e.g. a container filled with a fill substance. Such a container can be, for example, a tank, a pipe, a conveyor belt, or any other form of container.

The radiation protection container has a window, through which the radiation emitted by the radiator positioned for measuring is radiated through a wall of the radiation protection container.

Usually, a radiation direction is selected, in the case of which the radiation penetrates that region of the container, which should be metrologically registered. On the oppositely lying side, the radiation intensity emerging from the container over a region to be metrologically registered (this intensity being dependent on the fill level or on the density of the fill substance) is quantitatively registered with a detector. The emerging radiation intensity depends on geometric arrangement and absorption. The latter of these is, in the case of fill level measurement and in the case of monitoring an exceeding or subceeding of a predetermined fill level, dependent on the amount of fill substance in the container, and in the case of density measurement, on the density of the fill substance. As a result, the emerging radiation intensity is a measure for the current fill level, the superseding or subceeding of the predetermined fill level, or the current density of the fill substance in the container.

Today, usually scintillation detectors having a scintillator, e.g. a scintillation rod, and a light receiver, e.g. a photomultiplier, are used as detector. The scintillation rod is composed of a special plastic, e.g. polystyrene (PS) or polyvinyl toluene (PVT), which is very optically pure. Gamma radiation triggers light flashes in the scintillation material, whose light is registered by the photomultiplier and converted into electrical pulses. Connected to the photomultiplier is a measuring device electronics, which, based on the electrical pulses, determines a pulse rate with which the pulses occur. The pulse rate is dependent on the radiation intensity, and is thus a measure for the physical variable to be measured.

Solid scintillation rods have, however, the disadvantage that, due to their dimensions, they cannot at all or can only very poorly be connected to light receivers which today are obtainable in very small forms of construction, since, in such case, a large part of the light would radiate unused past the light receiver. Correspondingly, such scintillation rods are usually used in connection with large and expensive photomultipliers.

Added to this is the fact that, in the case of solid scintillation rods, due to manufacturing-related surface defects, a portion of the light escapes laterally from the rod, and is therewith lost for metrological registration.

Detectors are known, in the case of which, instead of solid scintillation rods, scintillating fibers are applied. Scintillation fibers have, as a rule, a diameter in the order of magnitude of 1 mm, or in the case of fibers with a polygonal cross section, a cross sectional area in the order of magnitude of 1 $mm^2$, and can accordingly be connected very well to small light receivers.

In JP 09 080156 A, a radiometric measuring arrangement is described, which serves to measure a radiation dose emerging from a radioactive fill substance located in a container. For this, a detector is used, which has a helical scintillation fiber wound around the container, on whose two ends a light receiver, here a photomultiplier or an avalanche photo diode, is, in each case, connected. Radiometric radiation emerging from the fill substance produces light flashes at locations along the fiber impinged upon by the radiation, with these light flashes propagating toward the two ends of the scintillation fiber. Connected to the two light receivers is a signal processing unit, which determines a travel time difference of the received signals attributable to one and the same light flash, and, based on the propagation velocity of the light signals in the fiber, determines therefrom the location of origination of the associated light flash.

This arrangement is, however, in the described form only useable in connection with radioactive fill substances, since the fiber surrounds the container on all sides. In connection with the above named measuring arrangement, in the case of which a radiation source arranged outside of the container is used, this arrangement would essentially metrologically register the radiative power of the source. Moreover, the length of the scintillation fiber is limited, since the light is attenuated in the fiber. Correspondingly, the arrangement is only useable in connection with relatively small containers.

In comparison to a solid scintillation rod, an individual scintillation fiber has the disadvantage that it has a considerably smaller irradiated mass. Accordingly, the radiative power that impinges on an individual scintillation fiber is, in comparison, very small.

This low irradiated mass can, for example, be compensated by the measuring arrangement described in EP 1 068 494 B1, wherein a detector is used, in which a number of scintillation fibers are combined to form a bundle, whose diameter is greater than the diameter of the individual fibers. The entire bundle is connected at one end to a photomultiplier, which converts the light conveyed over the scintillation fibers into an electrical signal.

Due to an irradiated mass of in the fiber bundle which is increased in comparison to an individual fiber, the radiative power received by the detector is increased. However, a large, expensive photomultiplier is still made use of here. Due to the attenuation of the scintillation light in the fibers, the length of the bundle is limited. Moreover, fiber bundles are relatively rigid and inflexible. Through this, the region metrologically registerable with the scintillation fiber bundle, is constrained.

SUMMARY OF THE INVENTION

An object of the invention is to provide a radiometric measuring device for measuring a physical, measured variable—especially a fill level or a density—of a fill substance located in a container, or for monitoring an exceeding or subceeding of a predetermined limit value for the physical, measured variable, with a radioactive radiator, which, during operation, sends radioactive radiation through the container, and with a detector having at least one scintillator and at least one light receiver connected thereto, which detects a radiation intensity penetrating through the container, dependent on the physical, measured variable to be measured; wherein, with this measuring device, in an extremely flexible predeterminable region to be metrologically registered by the detector, a very precise measuring of the radiation intensity can be performed.

For this, the invention resides in a radiometric measuring device for measuring a physical, measured variable—especially a fill level or a density—of a fill substance located in a container, and/or for monitoring an exceeding or subceeding of a predetermined limit value for the physical, measured variable, comprising:

A radioactive radiator, which, during operation, sends radioactive radiation through the container; and a detector, which is arranged on a side of the container lying opposite the radiator and serves to receive a radiation intensity penetrating through the container, dependent on the physical, measured variable, and to convert such into an electrical output signal, wherein the detector has a carrier, on which at least one scintillation fiber is wound, which converts radiometric radiation impinging thereon into light flashes, whose light propagates in the respective scintillation fiber toward its ends, and includes at least one array (13, 13') of avalanche photodiodes (APD) operated in the Geiger mode for converting light impinging thereon into an electrical signal, wherein at least one end (E1, E2) of each scintillation fiber (11) is connected to avalanche photodiodes of one of the arrays (13, 13'), and wherein the detector has a measuring device electronics (23) connected to the avalanche photodiodes (APD), which, based on the electrical signals of the avalanche photodiodes (APD), produces the electrical output signal.

In a preferred embodiment, the ends of the scintillation fibers connected to the arrays have a cross sectional area, which covers a plurality of avalanche photodiodes.

In an additional embodiment, all avalanche photodiodes connected to one end of a scintillation fiber are connected electrically in parallel.

In an additional embodiment, all avalanche photodiodes of an array are connected electrically in parallel.

In a further development, all arrays or the arrays and the measuring device electronics are arranged in the interior of the carrier.

In another further development the arrays and the measuring device electronics are arranged in an explosion-protected housing arranged outside of the carrier, and the ends of the scintillation fibers connected to the arrays are led into the housing via an explosion-protected feedthrough.

In an additional further development, wound along the carrier are a plurality of scintillation fibers, each of which surrounds a section of the carrier.

In another further development, at least one of the scintillation fibers has along a longitudinal axis of the carrier at least one region with a higher winding density.

In an additional further development, one or more scintillation fibers are wound in two or more winding layers on top of one another.

Additionally, the invention includes a method for operation of a measuring device of the invention, in the case of which the two ends of one or more scintillation fibers extending parallel to one another are in each case connected to an array, and the measuring device electronics, based on the output signals of the array connected to the first ends of the scintillation fibers and the output signals of the array connected to the second ends of the scintillation fibers, derives a radiation intensity profile, which shows radiation intensity on the scintillation fibers as a function of location along the scintillation fibers.

It likewise includes an embodiment of this method, wherein based on the output signals of the arrays connected to the first ends and the arrays connected to the second ends, travel time differences between the two signal travel times are continuously determined, which light from a light flash triggered in a scintillation fiber requires for the two different travel distances from the location of origination of the light flash to the respective ends, a frequency distribution is registered, which gives the frequency with which the travel time differences occur, and therefrom, the radiation intensity profile is determined, which gives the radiation intensity, which the locations along the scintillation fibers associated with the travel time differences are exposed to.

Alternatively, it includes a further development of this method, in the case of which light of the light flash triggered in the scintillation fibers by radiometric radiation experiences on the two different travel distances from the location of origination of the light flash to the respective ends an attenuation dependent on the length of the respective travel distance, which is reflected in the amplitude of the output signals of the arrays connected to the scintillation fibers, the amplitude ratios between the amplitudes of the output signals of the arrays connected to the first ends and the amplitudes of the output signals of the arrays connected to the second ends are continually formed, a frequency distribution is registered, which gives the frequency with which the amplitude ratios occur, and therefrom, a radiation intensity profile is determined, which gives the radiation intensity, which the locations along the scintillation fibers associated with the amplitude ratios are exposed to.

The invention has the advantage that the irradiated mass of wound scintillation fibers is markedly higher than the irradiated mass of fibers which extend outward. Additionally, the amount of light in the scintillation fibers occurring due to radiation is measurable by the APDs operated in the Geiger mode extremely precisely and practically without losses.

A further advantage lies in the fact that, due to the APDs operated in the Geiger mode, a plurality of scintillation fibers can be used, which can be arranged in parallel or in a plurality of winding layers on top of one another, and that individual scintillation fibers or a plurality of scintillation fibers can be arranged on top of one another along the region to be metrologically registered in individual zones, in that the APDs connected thereto or the totality of the arrays are operated in parallel.

A further advantage lies in the fact that not only the radiation intensity as a whole, but, by means of APDs connected to both ends the scintillation fibers, also very detailed radiation intensity profiles along the region metrologically registered by the detector can be created. In such case, an extremely high locational resolution is achievable with the wound scintillation fibers.

BRIEF DESCRIPTION OF THE DRAWINGS

The invention and other advantages will now be explained in greater detail on the basis of the figures of appended drawing, in which five examples of embodiments are presented; in the figures, equal parts are provided with equal reference characters. The figures of the drawing show as follows.

DETAILED DISCUSSION IN CONJUNCTION WITH THE DRAWINGS

Figure 1:
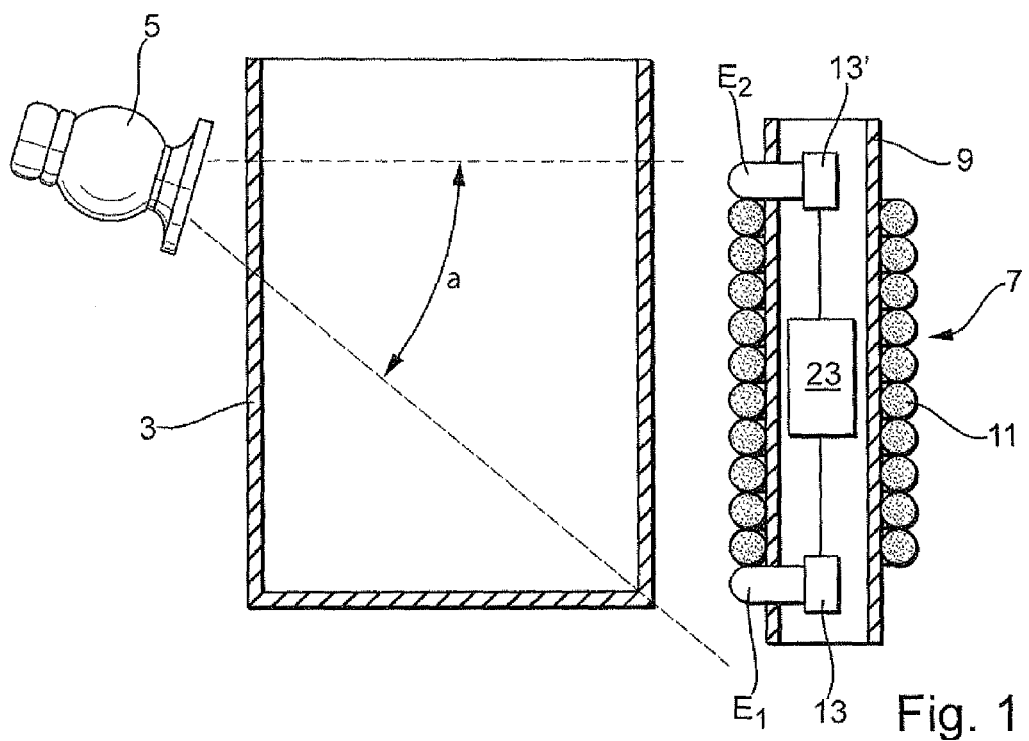
FIG. 1 is a radiometric measuring arrangement.

FIG. 1 shows a sketch of the principles of a measuring arrangement having a radiometric measuring device of the invention for measuring a physical, measured variable—especially a fill level or a density—of a fill substance located in a container and/or for monitoring an exceeding or subceeding of a predetermined limit value for the physical, measured variable.

The measuring arrangement includes a container 3 fillable with a fill substance 1, and a radioactive radiator 5 mounted on the exterior on the container 3, which, in measurement operation, sends radioactive radiation through the container 3. The radiator 5 includes a radiation protective container, into which a radioactive preparation, e.g. a Co 60 or Cs 137 preparation, is inserted. The radiation protection container includes a window, through which the radiation escapes in a radiating direction predetermined by the orientation of the window, and irradiates the container 3. A radiation cone forms around the radiating direction with an aperture angle a, which irradiates a region of the container 3 to be metrologically registered.

On a side of the container 3 lying opposite the radiator 5, a detector 7 (here shown in section) is arranged, which serves to receive penetrating through the container 3 over an application-specific, predetermined region to be metrologically registered by the detector 7 a radiation intensity dependent on the physical, measured variable, and to convert this into an electrical output signal.

Detector 7 includes a carrier 9 and at least one scintillation fiber 11 wound onto the carrier 9. Scintillation fibers 11 convert radiometric radiation impinging thereon into light flashes, whose light propagates in both directions within the respective scintillation fiber 11, up to its ends E1, E2. Via the winding of the scintillation fibers 11, a marked increasing of the mass which is radiated through is achieved. A wound scintillation fiber 11 accordingly absorbs clearly more radiative power than an individual stretched out fiber.

At least one end E1, E2 of each scintillation fiber 11 is connected to an array 13, 13' of avalanche photodiodes (APD) operated in the Geiger mode. As already mentioned, due to the attenuation of the light occurring in scintillation fibers 11, the length of scintillation fibers 11 is limited to a predetermined maximum length. If the two ends E1, E2 of scintillation fibers 11 are each connected to APDs of an array 13, 13', scintillation fibers 11 up to twice as long can then be used.

The arrays 13, 13' are very small and cost effective in comparison to photomultipliers. They are, for example, sold by the firm HAMAMATSU under the product designation Multi-Pixel Photon Counter. Obtainable from such source are, for example, arrays with an active area of 1×1 mm, on which 100, 400 or 1600 APDs are arranged, and arrays 13 with an active area of 3×3 mm, on which 900, 3600 or 14400 APDs are arranged.

Figure 2:
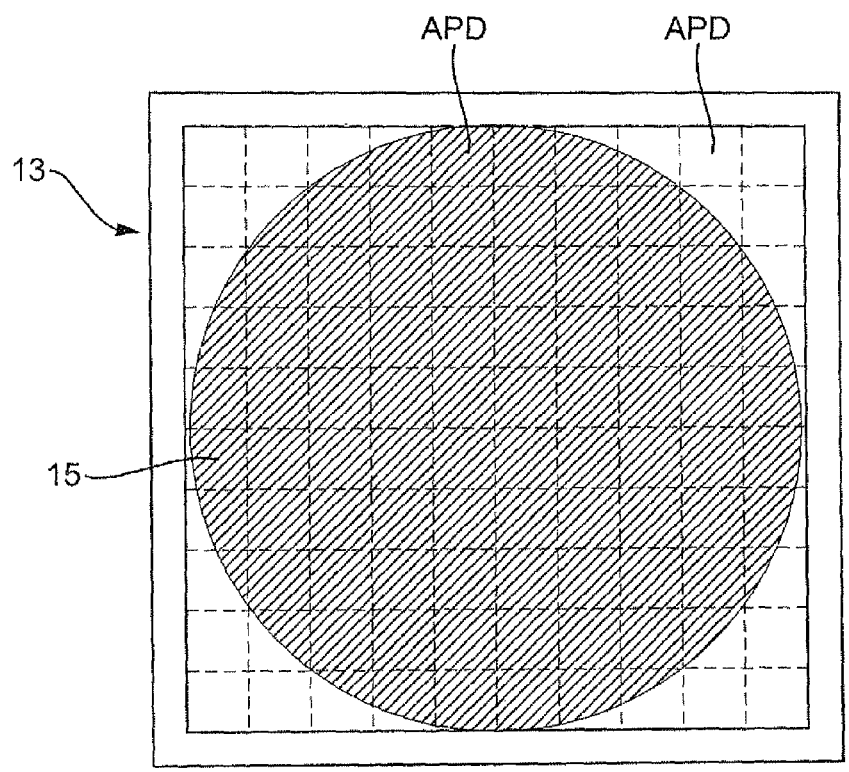
FIG. 2 is an array of avalanche photodiodes with a scintillation fiber end connected thereto.
Figure 3:
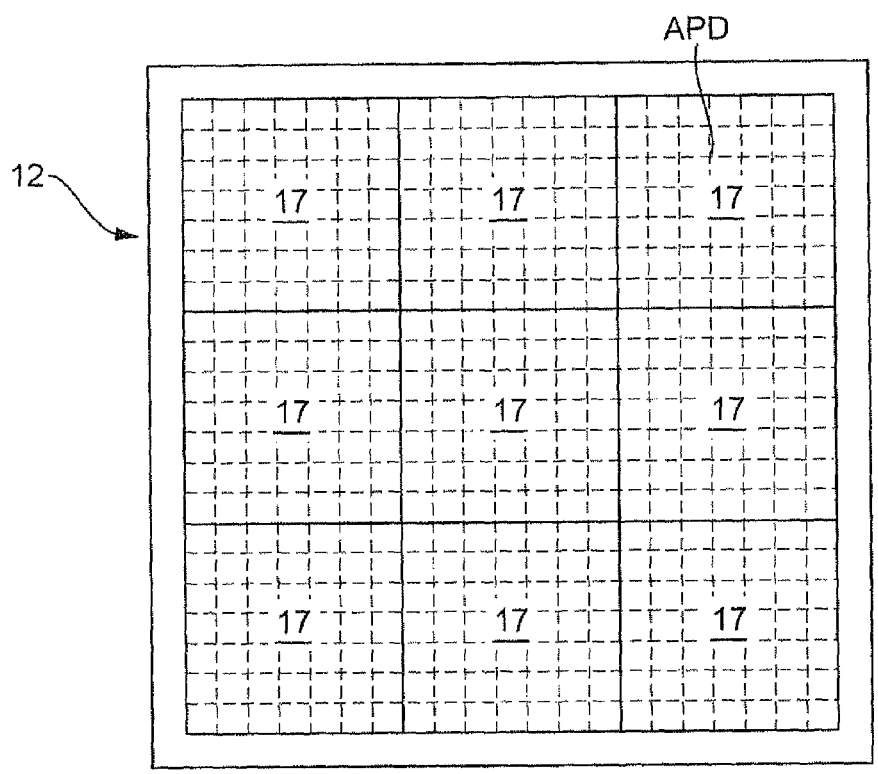
FIG. 3 is an array of avalanche photodiodes with nine scintillation fiber ends connected thereto.

Scintillation fibers 11 are obtainable with, for example, a diameter in the order of magnitude of 1 mm, or, in the case of fibers with polygonal cross sections, with a cross sectional area in the order of magnitude of 1 $mm^2$, and are therewith optimally suitable for connection to these arrays 13. FIG. 2 shows a fiber end 15 with a round cross section, connected to an array 13. The fiber end 15 has a cross sectional area which covers a plurality of APDs, here just under 100 APDs. If a plurality of scintillation fibers 11 are used in parallel, a plurality of scintillation fibers 11 are then preferably connected to an array 13. FIG. 3 shows nine fiber ends 17, each with a rectangular cross section, connected to an array 13.

Figure 4:
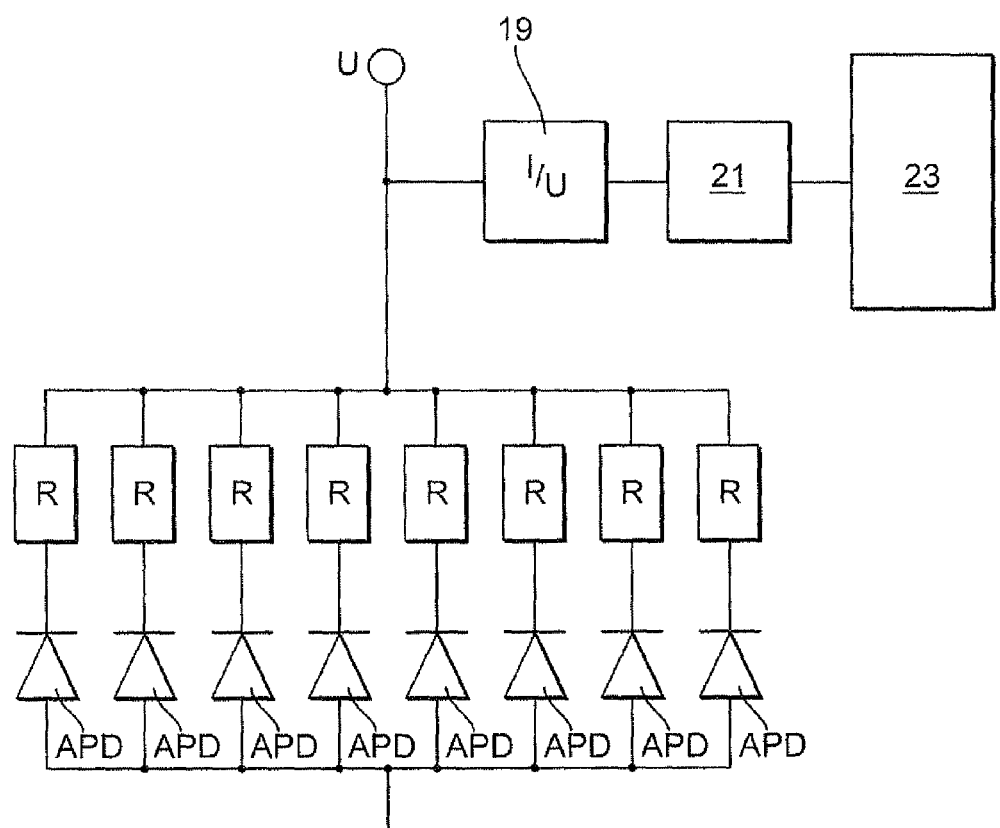
FIG. 4 is a circuit diagram with avalanche photodiodes connected electrically in parallel and operated in the Geiger mode.

The APDs convert light impinging thereon into an electrical signal. With these arrays 13, it is possible to detect extremely low amounts of light occurring spatially distributed across the cross sectional area of the ends E1, E2 of the scintillation fibers 11. In such case, the APDs are preferably operated in the Geiger mode. FIG. 4 shows a corresponding measurement circuit. There, at each APD in the blocking direction, an equal voltage U is present which is constant for all APDs of an array 13, and which lies above the avalanche voltage of the diodes. In this state, even an individual photon occurring on an APD leads to a Geiger discharge, which, as an output current, flows over a quench resistor R connected in series with the APD. In this way, a highly accurate measuring of the produced light amount, and therewith the radiation intensity, is correspondingly possible. The strength of the output current is constant and independent of the number of photons that have led to the discharge. The Geiger mode offers the advantage that a plurality of APDs can be connected electrically in parallel, as is schematically presented in FIG. 4. The output current of the parallel circuit is then equal to the sum of the output currents of the individual APDs in which a discharge has taken place, and is, for example, converted via a current-voltage converter 19 into a voltage, which is fed to a comparator circuit 21. Converter 19 and comparator circuit 21 are preferably integrated into the array chip, and consequently are not separately presented in the remaining figures. At the output of the comparator circuit 21, an output signal A is therewith available, which corresponds to the plurality of APDs connected in parallel which, at this point in time t, have received at least one photon. In such case, the Geiger mode operation enables a very high measure of flexibility as regards signal pickup and evaluation. For example, all APDs connected to scintillation fibers 11 can be connected in parallel, and all APDs connected to the first ends E1 and/or all APDs connected to the second ends E2 of a plurality of parallelly operated scintillation fibers 11 can be connected in parallel. Likewise, two or more arrays 13, 13' can be operated in parallel. In this way, the obtaining of the measurement signal can be tailored in a very flexible manner to the most varied of measuring tasks.

The output signals A are fed as output signals of the respective array 13 to a measuring device electronics 23, which determines therefrom a pulse rate, i.e. the number of APDs triggered per time unit. In such case, all APDs of all arrays 13, 13' can be operated in parallel, so that the individual output signals A of the arrays 13, 13' are added up to a sum signal. The pulse rate derived based on this sum signal is a measure for the total light amount occurring in all scintillation fibers 11, and is therewith a measure for the radiation intensity impinging on the associated scintillation fibers 11. This is, in turn, a measure for the physical, measured variable to be measured or monitored. From this, the measuring device electronics 23 generates an output signal corresponding to the sought measured variable, and makes this available to a display and/or to an additional processing unit. The output signal is output, for example, via a current output, a digital output or via a data bus connection.

For achieving an extremely compact form of construction of the detectors 7 of the invention—as is presented in the examples of embodiments illustrated in FIGS. 1, 7, 8 and 10—hollow carriers 9 are preferably applied and the array or the arrays 13, 13' are arranged in the interior of the carrier 9. Preferably, the measuring device electronics 23 connected to the arrays 13, 13' is also arranged in the interior of carrier 9.

Figure 5:
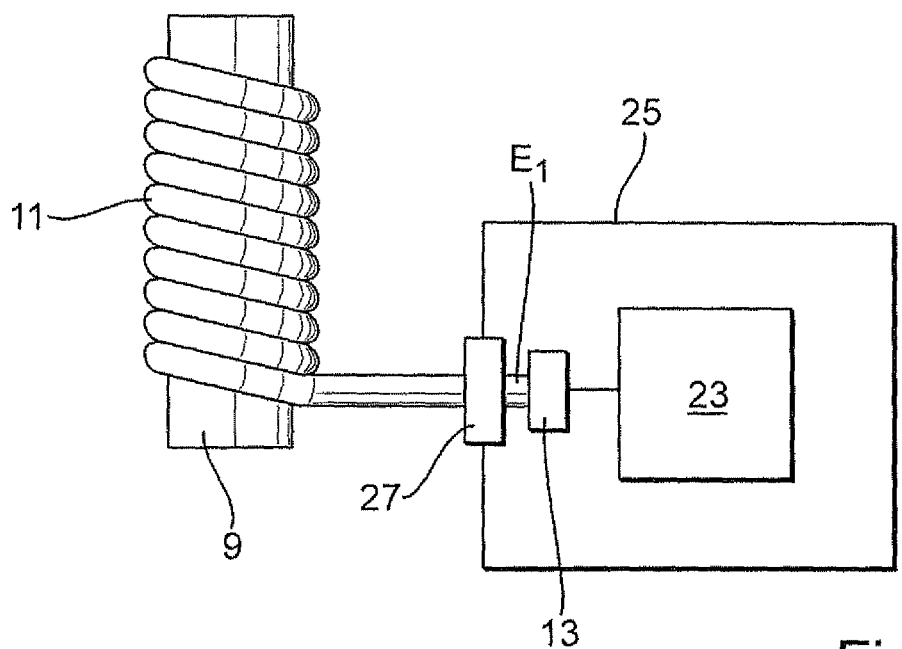
FIG. 5 is a detector with an explosion-protected housing for accommodating the array and the measuring device electronics.

An exception to this is formed by applications in the case of which the measuring device is used in explosive atmospheres. There, as a rule, it is legally prescribed that electrical components which convey energies which are sufficient to produce an ignition spark are arranged in pressure-resistant encapsulated housings. Since the scintillation fibers 11 themselves do not contain any electrical components relevant for explosion protection, the scintillation fibers 11 can be laid exposed, even in explosive atmospheres. Consequently, in these applications, measuring devices of the invention are preferably applied, wherein the array 13 and the measuring device electronics 23 are arranged in an explosion-protected housing 25, which is arranged outside of the carrier 9, and the ends E1 of the scintillation fibers 11 connected to the array 13 are inserted into the housing 25 via an explosion-protected feedthrough 27. An example of this is shown in FIG. 5.

The detectors 7 of the invention offer a high measure of flexibility as regards the region which is irradiated by the radiator 5 and which is to be metrologically registered by the detector 7, and as regards the achievable measurement results.

In the variant shown in FIG. 1, the carrier 9 is a tubular spindle, on which a scintillation fiber 11 is wound with a constant winding density. Via the winding density, the height of the metrologically registerable region is, in such case, adjustable within the limits defined by the total length of the scintillation fiber 11. The greater the winding separation, the greater is the height of the metrologically registerable region. If only one end of the scintillation fiber 11 is connected to an array 13 of APDs, the latter's output signal, which is proportional to the number of triggered APDs, is fed to the measuring device electronics 23. This then determines, as described above, the radiation intensity arising on the scintillation fiber 11 (which is dependent on the measured variable) and derives the measured variable therefrom. If, for increasing or doubling the maximum usable fiber length, the two ends E1, E2 of the scintillation fiber 11 are in each case connected to an array 13, 13', the output signals of the two arrays 13, 13' are fed to the measuring device electronics 23, which then, based on the sum of the output signals, determines the radiation intensity.

If the two ends E1, E2 of a scintillation fiber 11 are each connected to an array 13, 13', the radiation arising on the scintillation fiber 11 can alternatively or additionally be associated by means of the output signals of the two arrays 13, 13' with locations along the scintillation fiber 11, on which light flashes occurring due to the impinging radiation are triggered. For this, the two subsequently described methods can be applied, for example.

A first such method based on a travel time measurement is described in detail in DE 101 32 267 A1, and is performable with a markedly improved accuracy of measurement with the measuring devices of the invention. A photon absorbed at a particular location along the scintillation fiber 11 produces a light flash, whose light, after a first signal travel time $t_1$ dependent on the location of origination of the light flash, arrives at the one array 13, and after a second signal travel time $t_2$ dependent on the location of origination of the light flash arrives at the other array 13'. On the basis the output signals of the two arrays 13, 13' a travel time difference $\Delta t = t_2 - t_1$ between the two signal travel times $t_1$, $t_2$ is determined by the measuring device electronics 23. The travel time differences $\Delta t$ become evident due to the different travel distances of the light in the scintillator fiber 11, which are dependent on the location of origination. Based on the propagation velocity of the light in the scintillation fiber 11, or based on a corresponding measuring device calibration, these travel time differences are associated with the location of origination along the scintillation fiber 11 The measuring device of the invention offers here the advantage that over the height of the metrologically registered region, an extremely exact locational resolution is achievable, since the light in the wound scintillation fiber 11 must travel through one complete winding length in order to pass through one winding separation in height.

For highly accurate fill level measurement or for creation of a density profile over the height H metrologically registered by the scintillation fiber 11, the output signals A1, A2 of the two arrays 13, 13' are fed to measuring device electronics 23, which continuously determines the travel time differences and derives therefrom a frequency distribution, which gives the frequency with which the travel time differences occur. The frequency with which a particular travel time difference occurs gives the radiation intensity, which the location along the scintillation fiber 11 associated with this travel time difference is exposed to.

Since the scintillation fibers 11 are very thin, extremely small winding spacings, e.g. of a millimeter, can be implemented. In this way, very fine density profile measurements, as well as fill-level measurements accurate to the millimeter are for the first time possible. These accuracies are not achievable with the measuring device described in DE 101 32 267 A1, which uses a single solid scintillation rod.

Figure 6:
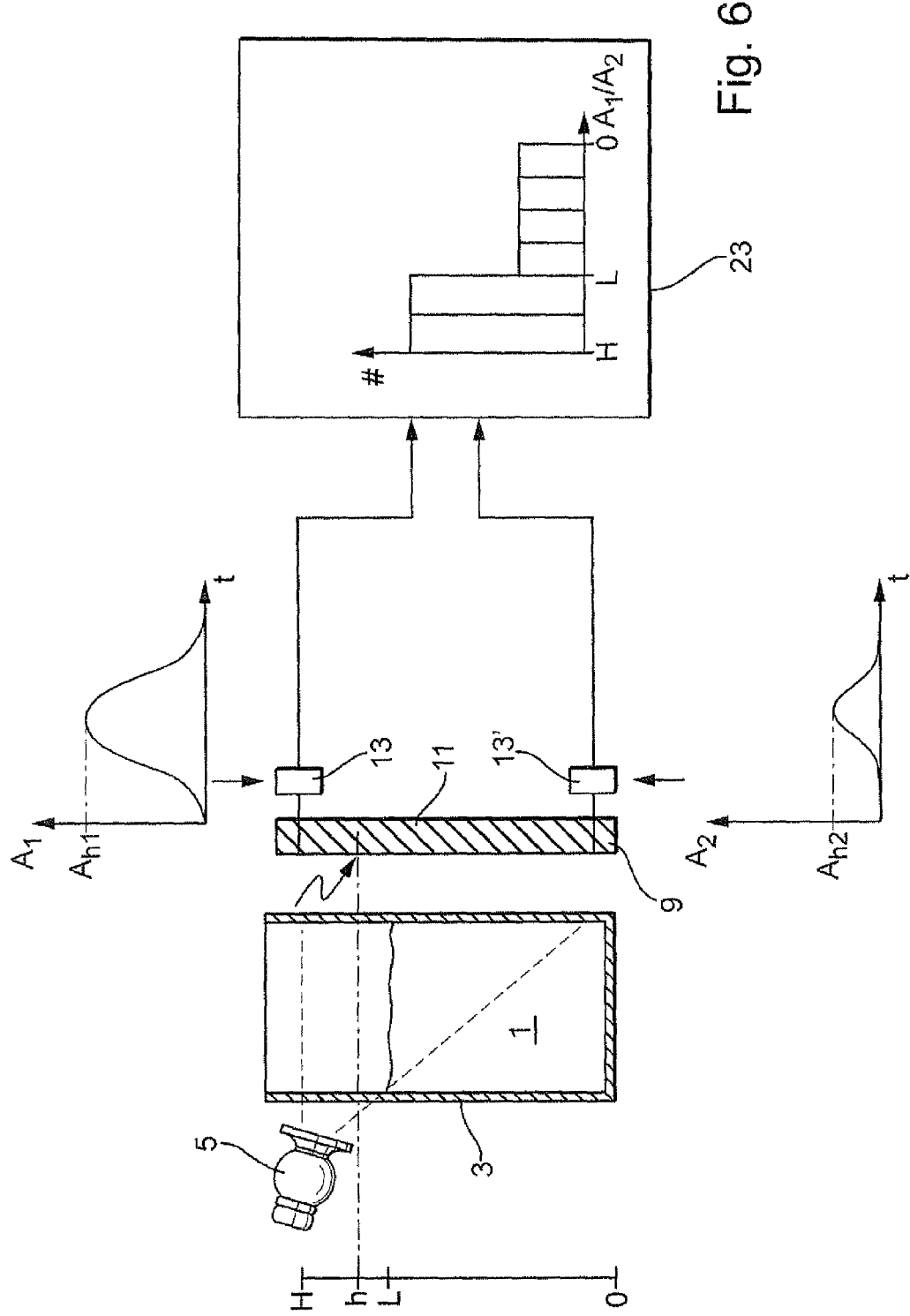
FIG. 6 is a measuring arrangement for registering a radiation intensity profile.

A second method is based on an amplitude comparison of the output signals A1, A2 of the two arrays 13, 13' and is presented in FIG. 6 in a sketch of the principle. A photon absorbed at a particular location h along the scintillation fiber 11 produces a light flash, whose light on the way to the one array 13 travels a first path dependent on the location of origination of the light flash, and on the way to the other array 13', travels a second path dependent on the location of origination of the light flash. On both paths, the light experiences attenuation dependent on the length of the particular path. This is reflected directly in the amplitudes A1, A2 of the output signals of the two arrays 13, 13'. Triggered by a gamma photon impinging on scintillation fiber 11 in the vicinity of the array 13 at the height h, array 13, as shown in FIG. 6, delivers an output signal A1 with a comparatively high amplitude $A_{h1}$, while the array 13' connected to the other end of the scintillation fiber 11 in this case delivers an output signal A2 with a much smaller amplitude $A_{h2}$. The ratio A1/A2 of the amplitudes of the two output signals is dependent on the location of origination of the light flash. The ratio A1/A2 becomes larger the closer the array 13 is to the location of origination, because amplitude A1 is in the numerator of the ratio. The ratio can accordingly be directly taken into consideration as a measure for the height along the region metrologically registered by the scintillation fiber 11. For highly accurate fill level measurement or for creation of a density profile over the height H metrologically registered by the scintillation fiber 11, the output signals A1, A2 are fed to the measuring device electronics 23, which continuingly forms the ratios of the amplitudes of the output signals, and derives therefrom a frequency distribution, which gives the frequency # with which the amplitude ratios A1/A2 occur. This can, as shown in FIG. 6 in the function block 23 of the measuring device electronics, occur in the form of a histogram. The frequency with which a particular amplitude ratio occurs gives the radiation intensity, which the location along the scintillation fiber 11 associated with the amplitude ratio is exposed to.

Both methods can naturally be performed not only with a single scintillation fiber 11, but also in a completely analogous manner with a plurality of scintillation fibers 11 run parallel to one another. In such case, the Geiger mode offers the advantage that all APDs connected to the first ends E1 of these scintillation fibers 11 are either directly connected electrically in parallel, or the associated arrays 13 are operated in parallel, in that the output signals of these array 13 can be added up to a sum signal. The same is naturally true for the second ends E2 of these scintillation fibers 11.

Figure 7:
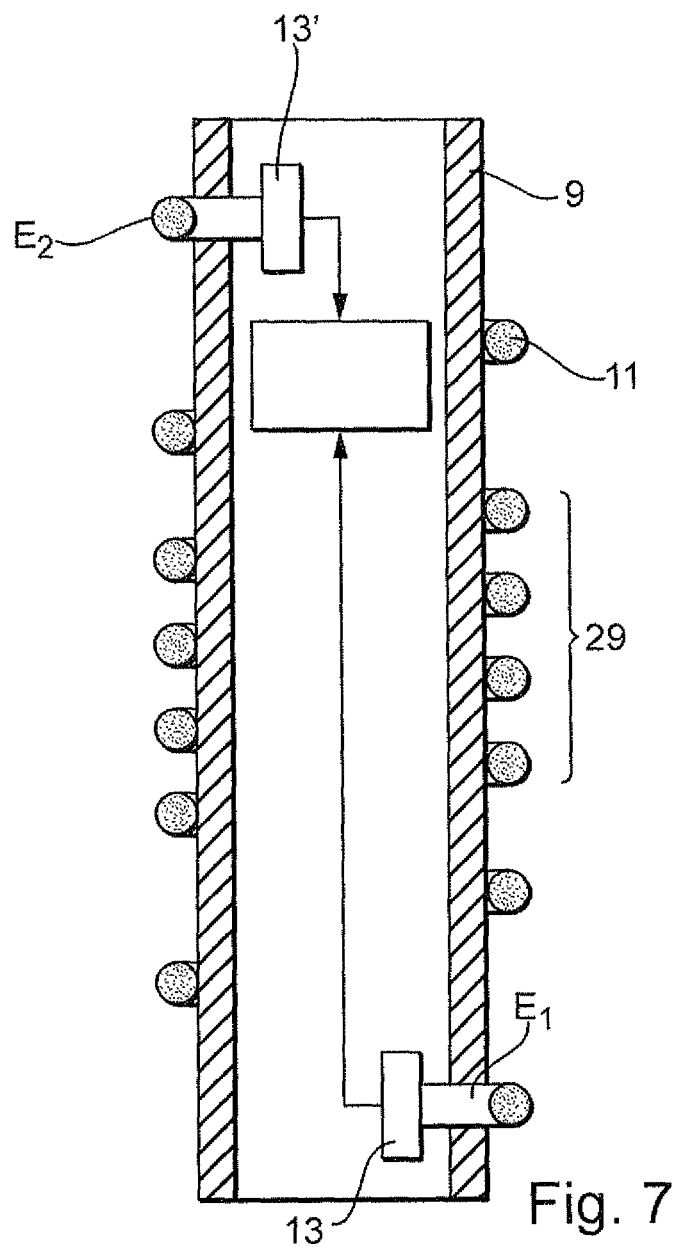
FIG. 7 is a carrier with a scintillation fiber wound thereon, which has a region with a higher winding density.

Instead of a constant winding density across the registered measuring range, detectors 7 can also be implemented, wherein at least one of the scintillation fibers 11 has at least one region 29 with a higher winding density along the longitudinal axis of the carrier 9. This variant is shown in FIG. 7. It is especially advantageous in connection with the two earlier described locational resolving methods, since here, via the regions 29 with a higher winding density, zones can be targetedly predetermined or selected, in which a higher locational resolution of the impinging radiation intensity is desired. These can be, for example in the context of a fill level measurement, zones in which an exceeding or subceeding of a predetermined fill level should be highly accurately monitored. Likewise, they can be for density measurements, in the case of which an especially detailed density profile should be created in individual zones, e.g. in zones, in which interfaces can form between individual fill substance layers.

Figure 8:
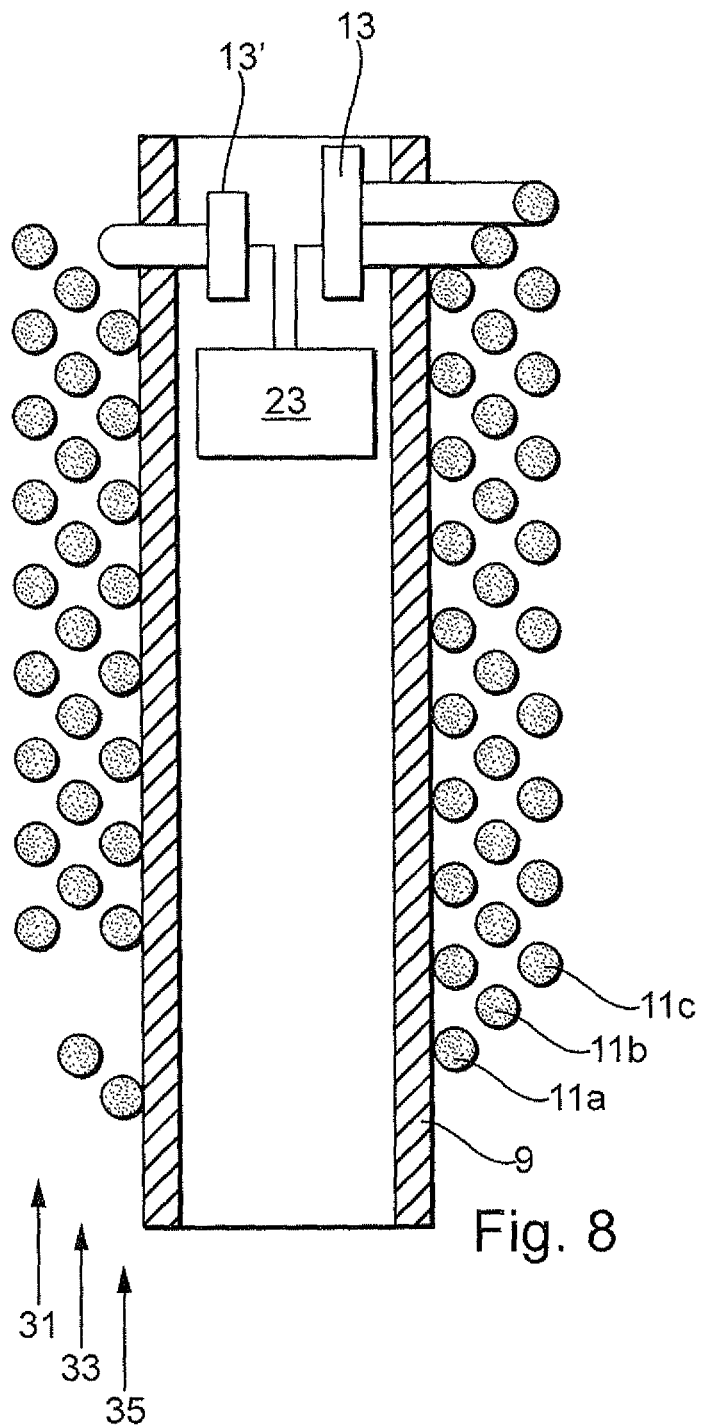
FIG. 8 is a carrier, on which scintillation fibers are applied in a plurality of winding layers.

FIG. 8 shows a section through another variant, wherein for increasing the irradiated mass, scintillation fibers 11a, 11b, 11c are wound on top of one another in two or more winding layer 31, 33, 35. In such case, depending on the height of the region to be metrologically registered, a single scintillation fiber 11 can be wound in multiple layers, or—as presented here—a separate scintillation fiber 11a, 11b, 11c can be used for each winding layer 31, 33, 35. If a plurality of scintillation fibers 11 are used, these can be connected in parallel relative to one another to one or more arrays 13 with APDs operated in the Geiger mode.

Figure 9:
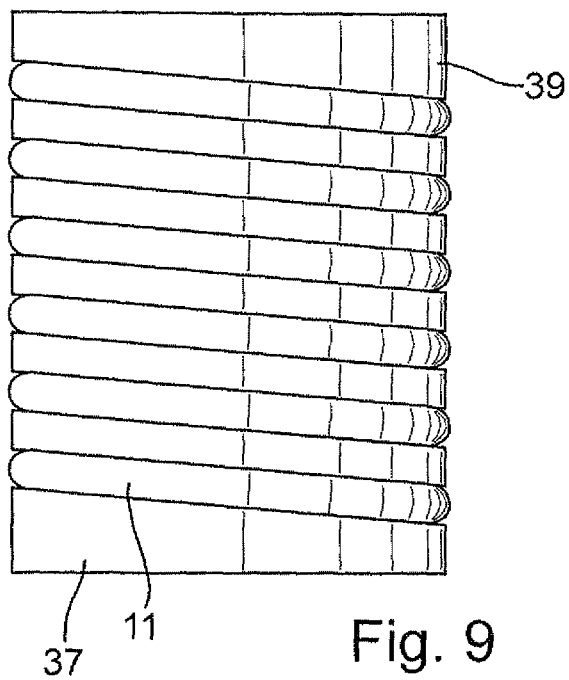
FIG. 9 is a scintillation fiber wound on a planar plate.

For increasing the cross sectional area of the metrologically registered region, areal shapes—such as, for example, plates 37 which are planar or warped in imitation of the container geometry—on which one or more scintillation fibers 11 are wound in one or more layers can also be used as carrier 9. This variant is shown in FIG. 9. As plates 37, planar or warped circuit boards, for example, which preferably are laterally provided with grooves 39 for accommodating the scintillation fibers 11, are suitable.

Figure 10:
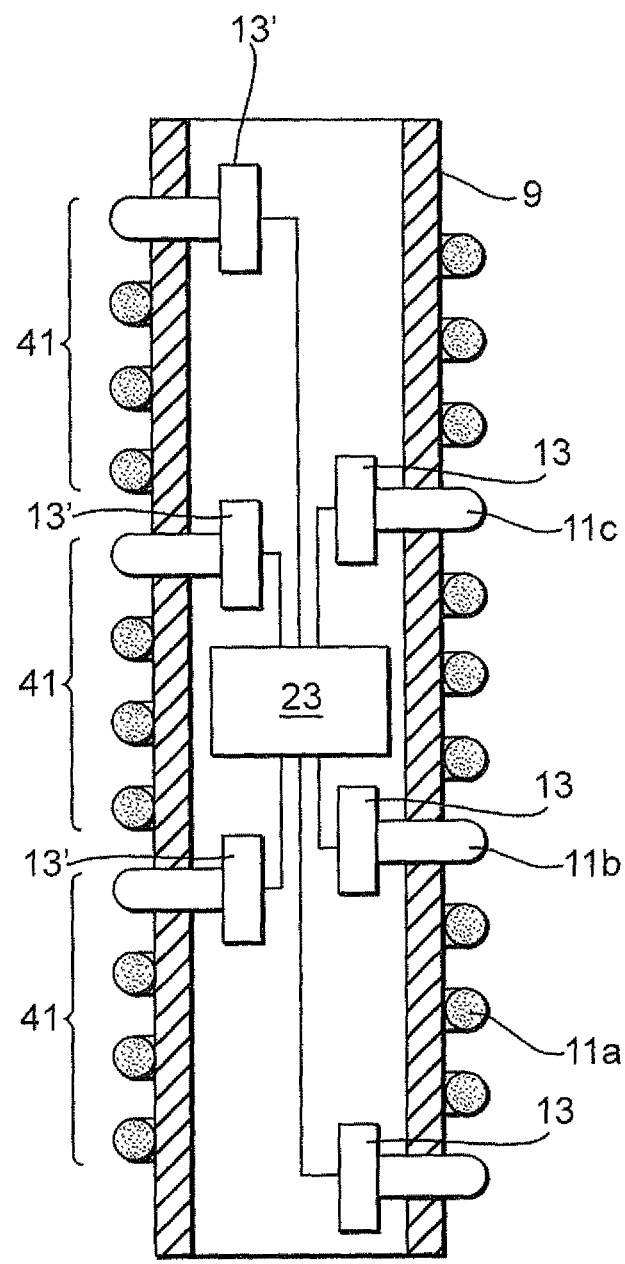
FIG. 10 is a carrier, which has individual portions on which, in each case, a scintillation fiber is wound.

In order to enlarge the height of the metrologically registered region, along a correspondingly long support 9, a plurality of scintillation fibers 11 can also be wound on top of one another on carrier 9, wherein the fibers in each case surround a section 41 of carrier 9. This variant is shown in FIG. 10 and is used, for example, to measure fill levels in very high containers 3. In order to achieve here a homogeneous covering of the entire height to be metrologically registered, the portions 41 border directly on one another. Alternatively, the individual sections 41 can also naturally be arranged at selected heights along the support 9, e.g. at heights, which lie in the region of predetermined fill levels, whose exceeding or subceeding should be monitored. Also here, instead of the illustrated individual scintillation fibers 11, in each section 41, a plurality of winding layers of one or more scintillation fibers 11 can naturally be provided on top of one another, as is presented in FIG. 8.

Also here, either an end E1 or the two ends E1 and E2 of each scintillation fiber 11a, 11b, 11c can in each case be connected to an array 13. The measuring can then be performed in various manners, depending on application and desired accuracy of measurement and resolution. In the simplest case, all of the APDs are operated in parallel; all APDs of each array 13, 13' are connected electrically in parallel, and the output signals A of all arrays 13, 13' are combined in the measuring device electronics 23 to a sum signal, and therefrom, the total radiative power recorded by the detector is determined. Alternatively, the radiative power can be individually determined for each region.

If the two ends E1, E2 of the scintillation fibers 11a, 11b, 11c are, in each case, connected to an array 13, 13', a locationally dependent radiation profile can then naturally also be derived here based on the two methods described above, which gives the radiative power as a function of the location versus the height of the detector 7 covered by individual portions 41 or all portions 41.

The invention claimed is:
1. A radiometric measuring device for measuring a physical, measured variable, of a fill substance located in a container, and/or for monitoring an exceeding or subceeding of a predetermined limit value for the physical, measured variable, comprising:
  a radioactive radiator, which is mounted on the exterior on the container and, during operation, sends radioactive radiation through the container; and
  a detector, which is mounted on the exterior on the container and is arranged on a side of the container lying opposite said radiator and serves to receive a radiation intensity penetrating through the container, dependent on the physical, measured variable, and to convert such into an electrical output signal, said detector having:
  a carrier, on which at least one scintillation fiber is wound, which converts radiometric radiation impinging thereon into light flashes, whose light propagates in said respective scintillation fiber toward its ends;

at least one array of avalanche photodiodes operated in Geiger mode for converting light impinging thereon into an electrical signal, wherein at least one end of each of said scintillation fiber is connected to an avalanche photodiodes of one of the arrays; and a measuring device electronics connected to said avalanche photodiodes, which, based on the electrical signals of said avalanche photodiodes, produces the electrical output signal.

2. The radiometric measuring device as claimed in claim 1, wherein:

ends of said scintillation fibers connected to said at least one array each have a cross sectional area, which covers a plurality of said avalanche photodiodes.

3. The radiometric measuring device as claimed in claim 1, wherein:

all said avalanche photodiodes connected to an end of a respective one of said scintillation fiber are connected electrically in parallel.

4. The radiometric measuring device as claimed in claim 1, wherein:

all said avalanche photodiodes of an array are connected electrically in parallel.

5. The radiometric measuring device as claimed in claim 1, wherein:

all said arrays or said arrays and said measuring device electronics are arranged internally of said carrier.

6. The radiometric measuring device as claimed in claim 1, wherein:

said array and said measuring device electronics are arranged in an explosion protected housing arranged outside of said carrier; and said ends of said scintillation fibers connected to said array are led into said housing via an explosion-protected feedthrough.

7. The radiometric measuring device as claimed in claim 1, wherein:

along said carrier a plurality of said scintillation fibers are wound, each of which surrounds a section of said carrier.

8. The radiometric measuring device as claimed in claim 1, wherein:

at least one of said scintillation fibers has at least one region along a longitudinal axis of said carrier with a higher winding density instead of a determined, constant winding density across the registered measuring range.

9. The radiometric measuring device as claimed in claim 1, wherein:

one or more of said scintillation fibers are wound on top of one another in two or more winding layers.

10. The radiometric measuring device as claimed in claim 1, wherein:

the two ends of one or more scintillation fibers extending parallel to one another are connected in each case to an array; and said measuring device electronics derives a radiation intensity profile, based on the output signals of the arrays connected to the first ends of the scintillation fibers, and on the output signals of the arrays connected to the second ends of the scintillation fibers, which profile shows a radiation intensity impinging on the scintillation fibers as a function of location along the scintillation fibers.

11. The radiometric measuring device as claimed in claim 1, wherein:

said measuring device electronics continuously determines, based on the output signals of the arrays connected to the first ends and the arrays connected to the second ends, travel time differences between the two signal travel times, which light from a light flash triggered in a scintillation fiber requires for the two different travel distances from the location of origination of the light flash to the respective ends;

said measuring device electronics registers a frequency distribution, which gives the frequency with which the travel time differences occur; and therefrom, said measuring device electronics determines the radiation intensity profile, which gives the radiation intensity, which the locations along the scintillation fibers associated with the travel time differences are exposed to.

12. The radiometric measuring device as claimed in claim 1, wherein:

said scintillation fibers attenuates, dependent on the length of the respective travel distance, the light of the light flash triggered in the scintillation fibers by radiometric radiation experiences on the two different travel distances from the location of origination of the light flash to the respective ends wherein said attenuation is reflected in the amplitude of the output signals of the arrays connected to the scintillation fibers;

said measuring device electronics continuously forms the amplitude ratios between the amplitudes of the output signals of the arrays connected to the first ends and the amplitudes of the output signals the arrays connected to the second ends;

said measuring device electronics registering frequency distribution, which gives the frequency with which the amplitude ratios occur; and therefrom, said measuring device electronics determines a radiation intensity profile, which gives the radiation intensity, which the locations along the scintillation fibers associated with the amplitude ratios are exposed to.

13. The radiometric measuring device as claimed in claim 1, wherein:

the physical, measured variable is a fill level or a density of a fill substance located in a container.

* * * * *